Jan. 15, 1952 F. FUA 2,582,774
METHOD AND APPARATUS FOR CALIBRATION OF X-RAY GAUGES
Filed Oct. 4, 1947 4 Sheets-Sheet 1
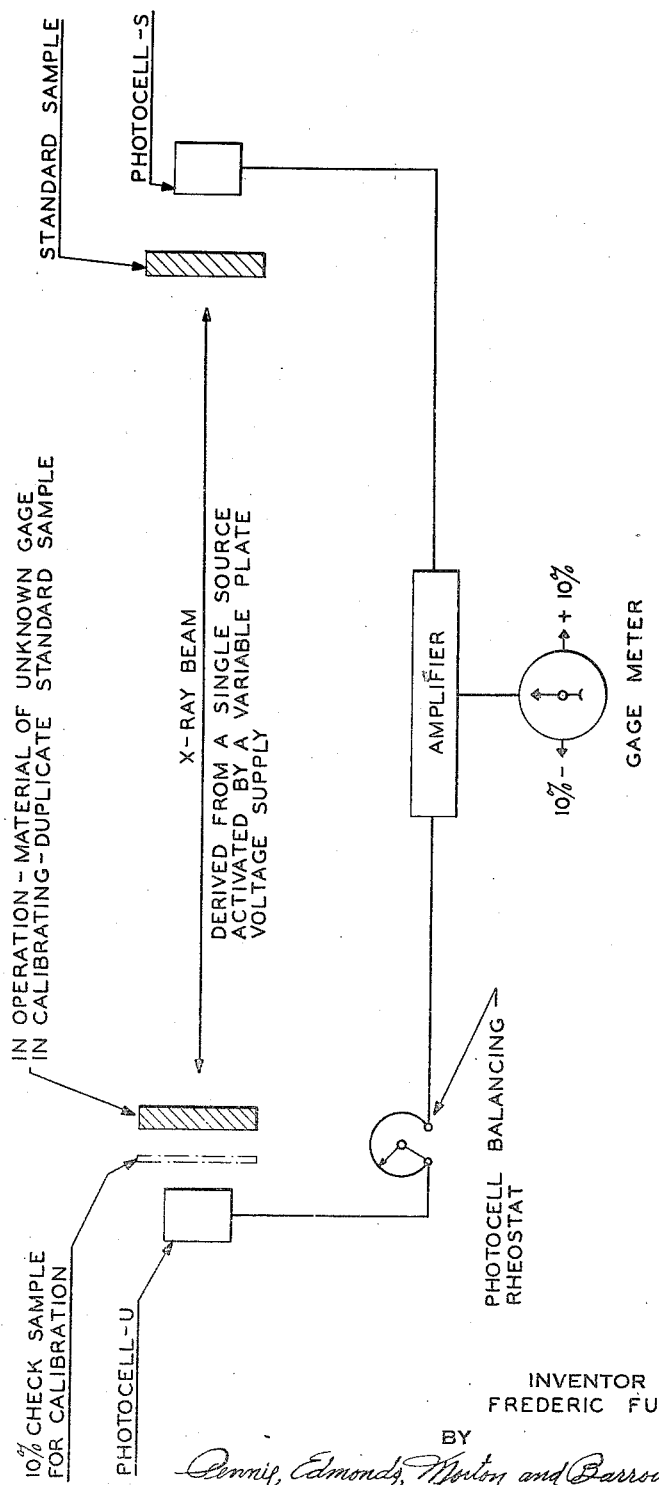
INVENTOR
FREDERIC FUA
BY
ATTORNEYS Jan. 15, 1952  F. FUA  2,582,774
METHOD AND APPARATUS FOR CALIBRATION OF X-RAY GAUGES
Filed Oct. 4, 1947  4 Sheets-Sheet 2

INVENTOR
FREDERIC FUA
BY
Pennie, Edmonds, Morton and Barrows
ATTORNEYS

Jan. 15, 1952 F. FUA 2,582,774
METHOD AND APPARATUS FOR CALIBRATION OF X-RAY GAUGES
Filed Oct. 4, 1947 4 Sheets-Sheet 3

INVENTOR
FREDERIC FUA
BY
Pennie, Edmonds, Morton and Barrows
ATTORNEYS

Jan. 15, 1952 F. FUA 2,582,774
METHOD AND APPARATUS FOR CALIBRATION OF X-RAY GAUGES
Filed Oct. 4, 1947 4 Sheets-Sheet 4

INVENTOR
FREDERIC FUA
BY
Penny, Edmonds, Morton and Barrows
ATTORNEYS

Patented Jan. 15, 1952

2,582,774

UNITED STATES PATENT OFFICE 2,582,774

METHOD AND APPARATUS FOR CALIBRATION OF X-RAY GAUGES

Frederic Fua, New York, N. Y., assignor to X-Ray Electronic Corporation, New York, N. Y., a corporation of New York Application October 4, 1947, Serial No. 777,897

14 Claims. (Cl. 250—83.3)

This invention relates to improvements in X-ray thickness gages and to systems of calibration for the same, and may be readily adapted to the general type of gage disclosed in the copending application of Fua and Woods, Serial No. 558,923, filed October 16, 1944, now Patent No. 2,525,292.

In gages of this general type, the penetration of X-ray from a single source through a standard sample and an unknown sample of similar composition is measured and compared electrically. By the inclusion in a gage of this type of certain variable circuit elements, and by the correlation of the X-ray tube target material to the material being measured, it is possible, following the method herein disclosed, to so calibrate the gage that any desired range of percentage departure, say from $-10\%$ to $+10\%$, of the thickness of the unknown from the thickness of the standard can be caused to utilize the full scale of possible deflection in the gage meter. Moreover, once the instrument is so calibrated on a standard, for example, of .050" thickness, the meter will read accurately over the same scale deflection the same range of percentage departures from standard for all other thicknesses of the same material. That is, if the meter is calibrated to utilize full-scale deflection to read percentage departures of $-10\%$ to $+10\%$ from a standard of .050" thickness, it will also utilize full-scale deflection to read percentage departures of $-10\%$ to $+10\%$ from a standard of .020" thickness of the same material without recalibration, notwithstanding the absolute range of thickness variation measured in the one case is .010" and in the other, .004".

Flowing from this discovery, I have also made certain ancillary inventions in specific circuit parameters and calibration techniques which enable me to construct a gage and calibrate it to read directly in absolute departures from standard for different base thicknesses with the minimum difficulties and without any practical loss of precision. This is especially valuable commercially because mill personnel are accustomed to "miking" sheets, for example, in thousandths of an inch and mill corrective procedures are based on such absolute readings. A further advantage flowing from one refined gage and calibration procedure of this invention, is the reduction in number of comparison standard samples required. The ultimate advantage in the most refined gage and calibration procedure permits gaging to any specification within the range of the instrument with direct reading in units of linear measurement and with only a comparatively small number of standard samples.

To illustrate the simple apparatus improvements required by this invention and to aid in visualizing the procedures to be followed in calibrating X-ray thickness gages according to the methods of this invention, I have prepared the accompanying drawings, in which:

Fig. 1 shows, schematically, certain essential elements of a gage arranged for one improved method of calibration of this invention;

Fig. 3, likewise, shows, schematically, similar elements arranged for a third such method;

Fig. 4 shows graphically a characteristic wavelength vs. absorption curve for X-ray; and Fig. 5 shows, schematically, the essential elements of the most refined gage and calibration technique according to this invention.

Figure 2:
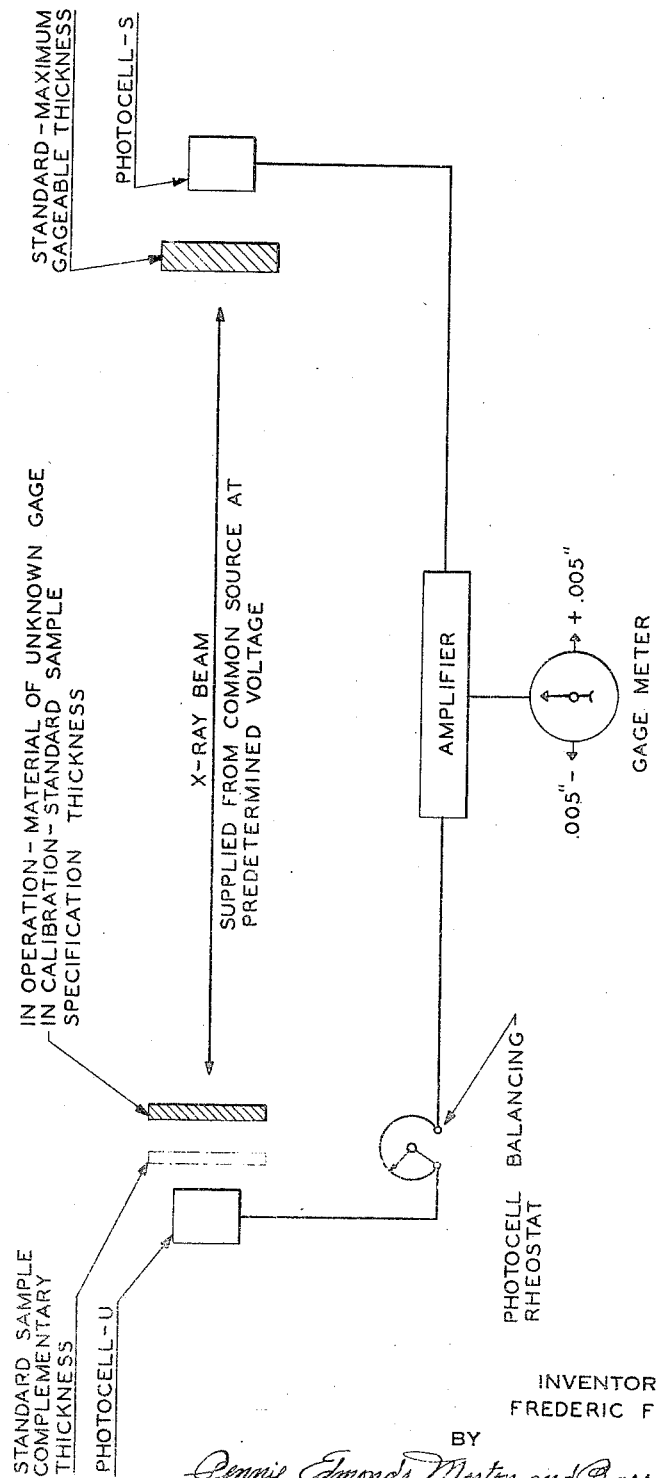
Fig. 2 shows, similarly, similar elements arranged for another such method of calibration.

By way of example merely, I shall describe my calibration procedures in connection with concrete commercial problems, but it will be understood, of course, that this invention is not limited to the details of the solution of those problems but rather by the scope of the appended claims.

Let us assume, first, that we wish to calibrate an X-ray thickness gage employing comparison standard samples as described generally in the Fua and Woods application for use in a brass sheet rolling mill in which we will be producing from time to time sheets of varying thickness, say from .010" to .050". We anticipate that the maximum departure from standard will not exceed $10\%$ in either direction and, accordingly, we would like to distribute the indications of this maximum departure over the full scale available on the gage meter in the interests of greater precision.

As a preliminary to the calibration of the gage, we must, of course, obtain samples of the desired standard thickness made from a material of the same composition, or at least of the same X-ray absorption characteristic, as the material to be gaged. Referring now to Fig. 1, one of these standard samples is inserted in the gage to intercept the X-ray beam falling on the photocell S. An identical sample is temporarily inserted in the place of the unknown sample to intercept the X-ray beam falling on the photocell U.

It will be understood that, in gages of this type described, both beams are derived from a common source and have identical qualitative and quantitative characteristics. It is, moreover, essential for practising this procedure of the invention that the X-ray tube producing the beams have a variable voltage plate supply, since I have discovered that there is only one voltage, in given apparatus, which will with a given sample, cause the full swing of the gage meter to be utilized to indicate any preselected percentage of thickness variation. For a gage appropriate for the practical operation selected as an example, I have found that a plate voltage range up to 50 kv., is sufficient. The other circuit parameters are then easily determined from design factors readily available to an electronics engineer.

Having now identical samples (Fig. 1) intercepting the X-ray beam falling on each of the photocells S and U the plate voltage is raised until the gage meter comes to a zero reading, thus indicating visually that the two samples are identical. It will, of course, be understood from the foregoing that the voltages applied across the two photocells S and U are not identical and that, in the amplifier, therefore, the "bucked" outputs of these two photocells when receiving identical inputs will result not in a null signal, but in a sensible signal representing the difference between the outputs of the two cells. The "zero" point representing specification thickness on the gage is not reached by the meter needle on a null signal, but on a signal of a predetermined absolute value. Thus the effect of altering the X-ray plate voltage is to alter the obsolute value of the actual input to the two photocells and hence to alter the obsolute value of the difference between their resulting outputs. Thus there is only one value of the X-ray plate voltage for any given specification thickness of metal which will bring the input to the photocell to the desired absolute level and cause the meter needle to swing to read "zero." By appropriate choice of instrument parameters in the gage meter, that instrument will read any desired percentage of thickness variation over its full scale deflection. If, for example, the indication of a 10% variation is sought, the accuracy of the gage meter selected may be checked by the insertion of an additional sample of 10% of the thickness of the base samples to intercept the X-ray beam falling first on photocell S and then on photocell U. If any error appears on this check, it must be corrected by readjustment of the photocell balancing rheostat and reselection of an appropriate plate voltage to give zero reading in the absence of the 10% check sample.

The discovery which I have made and which greatly increases the practical flexibility of an X-ray gage is that, if the X-ray tube target material is appropriately correlated to the composition of the material being gaged, then the rather laborious and time-consuming calibration procedure which I have just described need not be repeated each time it is desired to gage a run of material of different thickness. It is quite common, for example, in the brass rolling industry, to produce in a single day on a single machine several different thicknesses of sheet, say of .050", .030" and .020". If it were necessary to recalibrate the machine for each thickness, as I have described, much time would be lost and a portion of the advantage of the X-ray gage over the customary contact thickness gages would be lost. Moreover, it would be necessary to have two precision standard samples and a percentage variation check sample for each thickness to be produced.

I have discovered that, through selection, in the case of brass rolling, of a copper target in the X-ray tube, this recalibration can be avoided. A gage once calibrated as I have described for one thickness having a copper target in its X-ray tube, may be applied to gaging any other thickness of brass by simply adjusting the plate voltage to a figure appropriate to the thickness desired. Thus, on shifting the mill from rolling .050" sheet to .030" sheet, for example, it is necessary merely to adjust the plate voltage from the predetermined level known to be appropriate to gaging .050" brass to the voltage similarly known to be appropriate to .030" brass, and to replace the standard .050" sample intercepting the X-ray beam falling on photocell S by a .030" sample.

On the other hand, with a tungsten target, I have found that the gage must be entirely recalibrated for each change in thickness of brass being gaged. Among the acceptable target material-gaged material correlations which I have established as satisfactory are:

| Target: | Material gaged |
|---|---|
| Copper | Brass, copper |
| Iron | Steel |
| Cobalt | Cobalt, aluminum |

The explanation of this phenomenon may be found in the fact that for each element there is a characteristic curve of X-ray absorption versus X-ray wave length. Obviously, there are an infinite number of possible materials to be gaged and a large number of possible target materials as well, so that I have explored but a small fraction of the possible combinations. I have, however, discovered the necessity for proper correlation in this respect, and I have evolved a working hypothesis to explain the importance of this correlation and to afford what appears to be a sure basis for preselection of the proper materials.

The characteristic curve of absorption versus wave length has the general shape, for any given element, of that shown in Fig. 4. The characteristic X-ray produced by this same element as a target has a wave length slightly longer than that of the edge in the absorption curve. The wave length of this characteristic X-ray, therefore, corresponds to a point of low absorption coefficient for the same element. Moreover, if the anode potential of an X-ray tube is sufficiently high to excite this characteristic line of the target material, the intensity of the X-ray produced at this wave length is many times higher than the so-called white light spectrum of this tube. Thus, in effect, if we employ a target of the same material as the material being gaged, we may use for gaging effect what could be called a pseudo-monochromatic beam. This principle can be employed to properly correlate target materials with materials to be gaged which are not the same, with the same effect, the essential consideration being merely that the characteristic line of the X-ray beam employed be at only slightly longer wave length than that of the absorption edge of the material being gaged.

For an initial predetermination of the voltage appropriate to a particular thickness, the use of two standard samples of that thickness is required. Thus, having determined the proper voltage for gaging at .050" thickness, the determination of the correct voltage for gaging at .030" thickness involves the insertion of .030" standard samples to intercept the X-ray beam falling on both photocells S and U and the readjustment of the plate voltage so that the gage meter reads zero. When this adjustment of plate voltage is made, because of the preselected correlation between the X-ray tube target material and the material being gaged, the full scale deflection will continue to read the same percentage variation of the new thickness that it did for the original thickness.

It is readily apparent that the determination of a relatively small number of these voltages appropriate to selected thicknesses spaced across the whole range of thicknesses to be gaged will permit a determination of the voltage appropriate to any particular thickness within that range by interpolation. Moreover, it is apparent that once these voltages have been determined, the use of two standard samples to establish the zero point for any thickness will be unnecessary except as a calibration check procedure since the plate voltage control can be set to provide whatever predetermined voltage is required for gaging the desired thickness and the single standard sample of that thickness can be inserted to intercept the X-ray falling on the photocell S. The run of the unknown being gaged can then be started immediately and the gage will read its percentage variation from the standard correctly simply because of the plate voltage selected.

It will be observed that the foregoing apparatus and procedure achieves the maximum of flexibility in a single gage installation without loss of precision over the whole range of measurement. It does, however, require a gage meter reading in percentages which is not a customary arrangement in United States mill practice. A very simple expedient, however, can be employed to adapt the gage of the Fua and Woods application to direct reading on an absolute scale, for example, readings in thousandths of an inch. I have illustrated this adaptation schematically in Fig. 2. A further advantage of this set-up is that a variable voltage supply is not required for the X-ray beam, since it is always set at the voltage suitable for the maximum thickness in the range of thicknesses expected to be gaged. The calibration procedure for apparatus with this description is initially the same as that for the apparatus previously described, that is to say, that the X-ray is turned on with the voltage at the predetermined level, a standard sample of maximum thickness is inserted to intercept the X-ray beam falling on the photocell S and a standard sample of the specification thickness of the unknown material to be gaged is inserted to intercept the X-ray beam falling on the photocell U together with a standard sample of complementary thickness such that the combined thickness of these two samples equals the thickness of the maximum standard. The photocell balancing rheostat is adjusted, if necessary, to bring the gage meter to zero and one or two check samples of known thickness in thousandths are inserted to intercept additionally the X-ray beam falling on the photocell U, from which the correctness of the gage meter reading can be varied. It is apparent that, if .050″ has been selected as the maximum thickness desired to be gaged and the appropriate voltage set for this thickness, then if the other circuit parameters of the apparatus illustrated in Fig. 2 are the same as those illustrated in Fig. 1, the full swing of the gage meter, in showing a variation from −10% to +10% in thickness, also shows an absolute variation of from −.005″ to +.005″. It is further apparent that any variations in the thickness of the unknown material will, because of the continuing presence of the standard complementary sample, be readable directly in thousandths of an inch on the gage meter. The system shown in Fig. 2 has thus enabled the usual absolute gage reading of ordinary micrometer practice to be employed in X-ray gaging by a very simple expedient. There is, however, introduced a substantial disadvantage in that there is some loss of precision in gaging relative errors of thin unknowns, that is to say, that where the maximum variation to be expected in the unknown is in fact only, say, .003″, then only sixty per cent of the meter swing is employed to measure this variation. Moreover, an unconscionably large number of standard specification and standard complementary samples may be required if the number of different thicknesses expected to be gaged is great.

Figure 3:
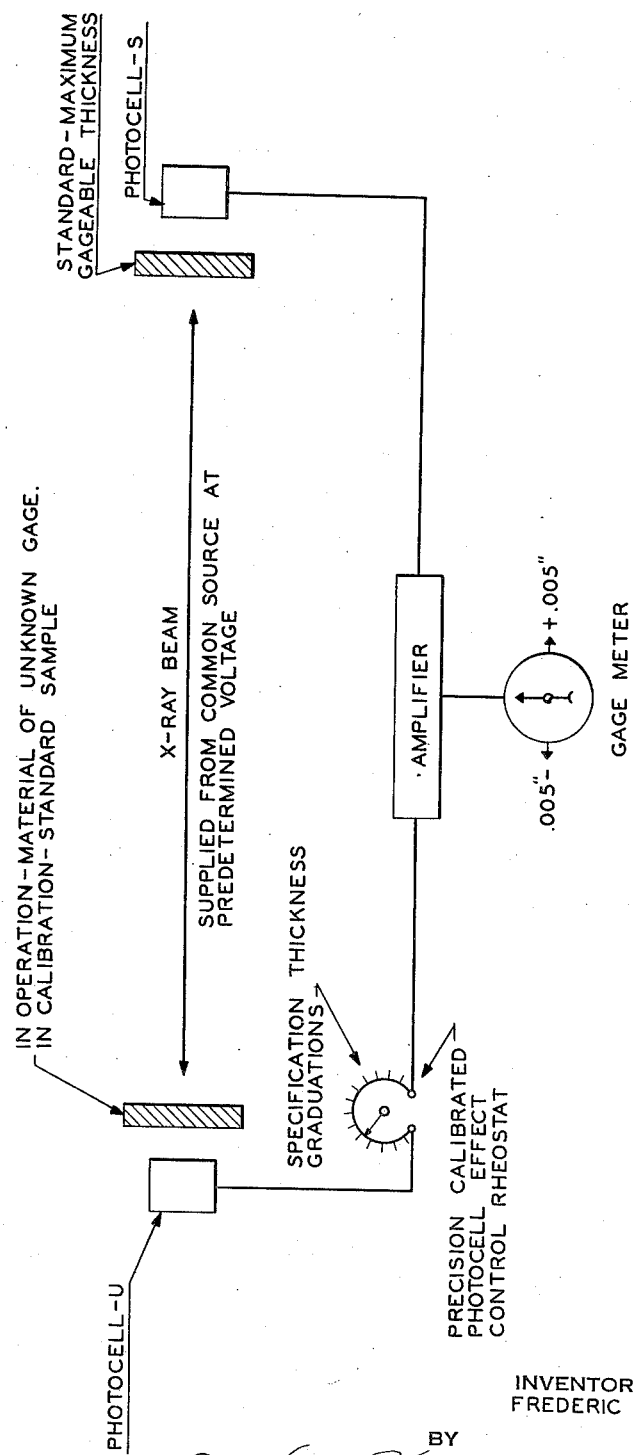

This latter difficulty can be overcome by employing the apparatus and method illustrated in Fig. 3. The objection to the necessity of providing a large number of accurate standard samples, while always one of cost, is much magnified by the common practice in metal rolling of adjusting the rolls not to produce a specification thickness as such, but rather to produce so many square feet of sheet material from an ingot of such and such a weight and density. In this latter case, it is obvious that the possible specification thicknesses are subject to multiplication almost without number. This problem can be met and absolute readings provided as well by the apparatus and method shown in Fig. 3, in which there is introduced between one of the photocells, preferably photocell U, and the amplifier, a precision calibrated control rheostat. The rheostat is not to be considered as the equivalent of the photocell balancing rheostat illustrated in Figs. 1 and 2, the latter being a mere trimmer device of limited range and uncalibrated.

The procedure to be followed in calibrating the apparatus shown in Fig. 3 is initially not dissimilar to that followed in calibrating the apparatus shown in Fig. 2. The X-ray voltage does not have to be varied in following the procedure illsutrated in Fig. 3, but it must, of course, be initially correct. That is, it must be such that when the maximum standard sample is inserted to intercept the X-ray beam falling on photocell S, when a specification standard sample is inserted to intercept the X-ray beam falling on photocell U, and when the photocell effect control rheostat is set to the reading corresponding to the thickness of the specification standard sample, the gage meter will read zero. If it happens that the specification standard thickness is the same as that of the maximum standard sample, then the gage meter responds exactly as the gage meter in Fig. 2 under the same conditions.

Let us assume, however, that it is desired to gage an unknown of some other, and lesser, specification thickness. In that case, all that is necessary is to turn the photocell effect control rheostat to the graduation corresponding to the thickness now desired to be gaged. The effect of this is to impose upon the electrical signal being transmitted by the photocell U to the amplifier a constant diminishing exactly equal to the constant diminishing which the complementary standard sample of the set-up in Fig. 2 brings about by different means.

The calibrations of the photocell effect control rheostat initially, and in periodic checks, are made with selected specification standard samples spread over the whole range of specifications to be gaged. Other values are inserted on the graduations by appropriate interpolation. Thereafter, in mill operation no specification standard samples are required, the operator setting the control rheostat to the specification thickness of the material being gaged, and reading the departure from specification on the gage meter in thousandths of an inch.

Figure 5:
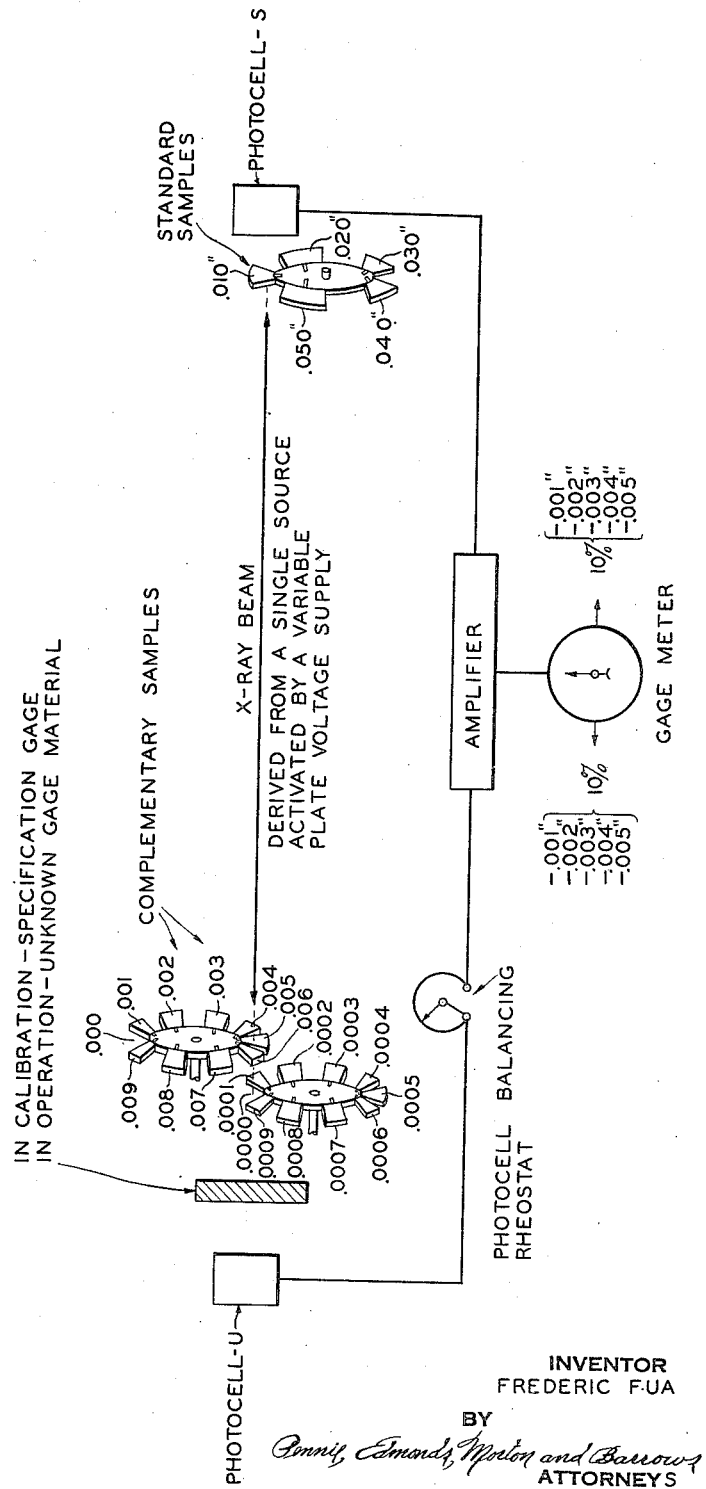

The most refined adaptation of the invention here disclosed is shown in Fig. 5. Both the apparatus and the method of Fig. 5 is essentially a combination of the most desirable features of Figs. 1 and 2. From the method and apparatus illustrated in and described in connection with Fig. 1, we carry over into the method and apparatus of Fig. 5, the variable plate voltage supply for the X-ray beam source and the X-ray tube target material correlation with the material to be gaged. This means, as already described, that once the gage has been adjusted to give an accurate percentage departure reading for any given standard sample thickness, merely adjusting the plate voltage appropriately for a new standard sample thickness will cause the gage meter to continue to give accurate percentage departure readings with the same circuit parameters and dial face. From the method and apparatus illustrated in and described in connection with Fig. 2, we carry over into the method and apparatus of Fig. 5, the use of complementary samples with the unknown to reduce the number of standard samples required.

Referring now to Fig. 5, we have selected for illustration a gage arranged for a range of 0–.50" thickness of material to be gaged. As a standard sample we employ a segment of a wheel containing five standard sample segments, of .010", .020", .030", .040", and .050", respectively, arranged so that any one segment may be interposed between X-ray source and photocell S at will. Each such segment sample corresponds to a standard of maximum gageable thickness in the arrangement according to Fig. 2, and the X-ray plate voltage supply is arranged to be conveniently variable to voltage levels appropriate to these five thicknesses. The voltage control means can preferably therefore be a five-step device rather than an infinitely variable one as preferred in apparatus according to Fig. 1. The target material in the X-ray source is, of course, correlated to the material being gaged and the standard sample as already explained in connection with Fig. 1.

In Fig. 5, the apparatus shown is set up to gage a material of .005" thickness. The standard sample segment next thicker than this specification thickness, i. e. .010", is therefore turned to intercept the X-ray beam falling on photocell S. To employ the method of Fig. 2, a complementary sample of .005" must, therefore, be interposed in the path of the X-ray beam falling on photocell U in addition to the material being gaged.

Two discs, each having nine complementary sample segments and a void segment are arranged to overlap in the path of the X-ray beam from the source to photocell U so any one segment of one disc and any one segment of the other disc may be simultaneously caused to intercept that beam. One disc has nine samples progressing in thickness from .001" to .009" by increments of .001"; the other, nine, progressing in thickness from .0001" to .0009" by increments of .0001". To accomplish the required thickness for the example illustrated the "ten-thousandths" disc is turned to interpose the void segment; the "thousandths disc," the .005" segment. Any deviation of the unknown from specification thickness will now be reflected on the gage meter as a percentage variation from .010".

It is clear that if we wish to gage another specification thickness, e. g. .0375", the following steps will be taken. First, set standard segment .040" in operating position. Next, set plate voltage supply to correct voltage step setting for .040". Thereafter, set off a complementary sample of .0025", i. e. .002" segment on the "thousandths" wheel; .0005" segment on the "ten-thousandths" wheel and the run of the unknown can begin. The gage meter will then measure a percentage variation from .040".

Since the gage meter actuating signal will always be proportional to percentages of one of five known values, a dial face having five rows of absolute values, for example, can be provided to give readings directly in fractions of an inch. A variety of systems are known for adjusting the response of signal responsive apparatus to correspond to the actual quantities being indicated by the signal in varying circumstances, any one of which may be employed on the gage of this invention.

The calibration procedure to be employed in apparatus according to Fig. 5 is simple. The whole task is done once, for a given material to be gaged, following the procedure already described for apparatus according to Fig. 1 to establish the five voltage levels for the five standard sample thicknesses. Thereafter, the gage operator need only know the specification thickness to be gaged and to set the several variable elements to correspond as described. The gage meter will give accurate readings without recalibration and the precision of the readings will likewise be correlated to need without further adjustment.

I claim:

1. In X-ray gaging apparatus, in combination, a holder for comparison samples of the material to be gaged, a plurality of comparison samples mounted on said holder varying in thickness from one to another by equal decimal increments of a predetermined unit of length, an X-ray tube having a target of a material which has a characteristic radiation of wave length longer than that of the absorption edge of the material to be gaged, a photocell arranged beyond said comparison sample holder from said tube and adapted to be excited in response to X-ray from said tube passing through any one sample on said holder selected at will, a second photocell arranged spaced from said tube to provide space for the insertion of a sample of unknown thickness of the material to be gaged and adapted to be excited in response to X-ray from said tube passing through said space, a series of complementary sample holders each carrying nine complementary samples of the material to be gaged, the samples on the first complementary sample holder having equal differences in thickness, according to the formula .1K . . . 9K, where K is the thickness difference between comparison samples, the samples on successive complementary sample holders having equal differences in thicknesses according to the formula .1K' . . . 9K' where K' is the difference between the thickness of successive samples on the preceding holder, said complementary sample holders being arranged to interpose no complementary sample or any combination of complementary samples not exceeding one on each holder at will in the path of the X-ray passing to said tube from the second photocell, electrical means for comparing and sensibly indicating the excitation of said photocells and a variable plate voltage supply for said output.

2. Apparatus according to claim 1 in which the means for varying the plate voltage supply is calibrated to correspond to the difference in comparison sample thickness.

3. Apparatus according to claim 1 in which the complementary sample holders are rotatable discs having ten equally spaced segmental areas, one of which areas is blank and the remaining nine of which areas contain the complementary samples arranged circumferentially from the blank segment area in order of increasing thickness, said discs being mutually arranged with respect to one another so that by rotation a single segmental area on each of them selected at will can be brought to lie on the same straight line.

4. The method of calibration of a gauge of the type including an X-ray tube arranged to project a pair of beams of X-ray, material to be gauged disposed to intercept one of said beams, a comparison sample of said material disposed to intercept the other of said beams, a photocell arranged to be activated in response to the X-ray beam penetrating said material, a second photocell arranged to be activated in response to the X-ray beam penetrating said comparison sample, a variable X-ray plate voltage supply, and an indicating photocell-output integrator giving a predetermined reading in response to a sensible integrated signal when the X-ray opacities of said material and said sample are equal, a target in said X-ray tube which has a characteristic radiation of a wave length longer than that of the absorption edge of the material to be gauged, but within the valley of the curve following that edge which comprises inserting identical standard samples of the material to be gauged to intercept the two X-ray beams and adjusting the plate voltage to give a zero reading on the indicating integrator.

5. The method of calibration according to claim 4 which comprises inserting a plurality of different standard samples of the material to be gauged in a series of identical pairs to intercept the X-ray beams being compared, adjusting the plate voltage to give a zero reading with each successive identical pair, and calibrating the plate voltage adjusting means by interpolation from the successive zero reading positions.

6. In X-ray gaging apparatus, in combination, a plurality of comparison samples of the material to be gaged having predetermined differences from one another in the characteristic being gaged, an X-ray tube having a target of material which has a characteristic radiation of wave length longer than that of an absorption edge of the material to be gaged but within the valley of the curve following that edge, a comparison sample holder in which said comparison samples are mounted arranged to interpose any one of said comparison samples at will in the path of X-ray from said tube, a first photocell arranged in the X-ray shadow of a comparison sample in said comparison sample holder and adapted to be excited in response to X-ray from said tube passing through said comparison sample, a second photocell arranged spaced from said tube to provide space for the insertion of an unknown sample of the material to be gaged and adapted to be excited in response to X-ray from said tube, electrical means for comparing and sensibly indicating the excitation of said photocells, a variable plate voltage supply to said tube, and a plurality of complementary sample holders each carrying plurality of complementary samples of the material to be gaged having predetermined differences from one another in the characteristic being gaged, said complementary sample holders being arranged to interpose no complementary sample or any combination of complementary samples not exceeding one on each holder at will in the path of X-ray passing from said tube to said second photocell.

7. The apparatus of claim 6 in which the variable plate voltage supply is calibrated to correspond to the predetermined differences in the comparison samples.

8. In X-ray gaging apparatus, in combination, a plurality of comparison samples of the material to be gaged having predetermined differences from one another in thickness, an X-ray tube having a target of material which has a characteristic radiation of wave length longer than that of an absorption edge of the material to be gaged but within the valley of the curve following that edge, a comparison sample holder in which said comparison samples are mounted arranged to interpose any one of said comparison samples at will in the path of X-ray from said tube, a first photocell arranged in the X-ray shadow of a comparison sample in said comparison sample holder and adapted to be excited in response to X-ray from said tube passing through said comparison sample, a second photocell arranged spaced from said tube to provide space for the insertion of an unknown sample of the material to be gaged and adapted to be excited in response to X-ray from said tube, electrical means for comparing and sensibly indicating the excitation of said photocells, a variable plate voltage supply to said tube, and a plurality of complementary sample holders each carrying a plurality of complementary samples of the material to be gaged having predetermined differences from one another in thickness, said complementary sample holders being arranged to interpose no complementary sample or any combination of complementary samples not exceeding one on each holder at will in the path of X-ray passing from said tube to said second photocell.

9. The apparatus of claim 8 in which the variable plate voltage supply is calibrated to correspond to the predetermined thicknesses of the comparison samples.

10. In X-ray gaging apparatus, in combination, a plurality of comparison samples of the material to be gaged having predetermined equal differences from one another in thickness, an X-ray tube having a target of material which has a characteristic radiation of wave length longer than that of an absorption edge of the material to be gaged but within the valley of the curve following that edge, a comparison sample holder in which said comparison samples are mounted arranged to interpose any one of said comparison samples at will in the path of X-ray from said tube, a first photocell arranged in the X-ray shadow of a comparison sample in said comparison sample holder and adapted to be excited in response to X-ray from said tube passing through said comparison sample, a second photocell arranged spaced from said tube to provide space for the insertion of an unknown sample of the material to be gaged and adapted to be excited in response to X-ray from said tube, electrical means for comparing and sensibly indicating the excitation of said photocells, a variable plate voltage supply to said tube, and a series of complementary sample holders each carrying a series of complementary samples of the material to be gaged, the samples on the first complementary sample holder forming a series having equal differences in thickness according to the formula $$\frac{1}{n+1}K \cdots \frac{n}{n+1}K$$

where $n$ is the number of samples on said first complementary sample holder and $K$ is the thickness difference between comparison samples, the samples on successive complementary sample holders forming, on each such holder, a series having equal differences in thickness according to the formula $$\frac{1}{n'+1}K' \cdots \frac{n'}{n'+1}K'$$

where $n'$ is the number of samples on each such holder and $K'$ is the difference between the thickness of successive complementary samples on the preceding holder, said complementary sample holders being arranged to interpose no complementary sample or any combination of complementary samples not exceeding one on each holder at will in the path of X-ray passing from said tube to said second photocell.

11. The apparatus of claim 10 in which the variable plate voltage supply is calibrated to correspond to the thickness difference between comparison samples.

12. In X-ray gaging apparatus, in combination, a comparison sample of the material to be gaged, an X-ray tube having a target of material which has a characteristic radiation of wave length longer than that of an absorption edge of the material to be gaged but within the valley of the curve following that edge, a first photocell arranged in the X-ray shadow of said comparison sample and adapted to be excited in response to X-ray from said tube passing through said comparison sample, a second photocell arranged spaced from said tube to provide space for the insertion of an unknown sample of the material to be gaged and adapted to be excited in response to X-ray from said tube, a variable plate voltage supply to said tube, and electrical means for comparing and sensibly indicating the excitation of said photocells, said electrical means comprising an amplifier receiving as input the output of both photocells and a photocell balancing rheostat in the circuit between one of said photocells and said amplifier for independently adjusting the relative magnitudes of the photocell outputs reaching said amplifier.

13. In X-ray thickness gaging apparatus, in combination, a standard comparison sample of material to be gaged of the maximum gageable thickness, an X-ray tube having a target of material which has a characteristic radiation of wave length longer than that of an absorption edge of the material to be gaged but within the valley of the curve following that edge, a first photocell arranged in the X-ray shadow of said comparison sample and adapted to be excited in response to X-ray from said tube passing through said comparison sample, a second photocell arranged spaced from said tube to provide space for the insertion of an unknown sample of the material to be gaged and adapted to be excited in response to X-ray from said tube, a plate voltage supply to said tube operated at a predetermined level, a complementary sample of a thickness equal to the difference between the thickness of said comparison sample and the specification thickness of the unknown material, said complementary sample being in the path of X-ray passing from said tube to said second photocell, and electrical means for comparing and sensibly indicating the excitation of said photocells, said electrical means comprising an amplifier receiving as input the output of both photocells and a photocell balancing rheostat in the circuit between one of said photocells and said amplifier for independently adjusting the relative magnitudes of the photocell outputs reaching said amplifier.

14. In X-ray gaging apparatus, in combination, a standard comparison sample of material to be gaged of the maximum gageable thickness, an X-ray tube having a target of material which has a characteristic radiation of wave length longer than that of an absorption edge of the material to be gaged, but within the valley of the curve following that edge, a first photocell arranged in the X-ray shadow of said comparison sample and adapted to be excited in response to X-ray from said tube passing through said comparison sample, a second photocell arranged spaced from said tube to provide space for the insertion of an unknown sample of the material to be gaged and adapted to be excited in response to X-ray from said tube, a plate voltage supply to said tube operated at a predetermined level, and electrical means for comparing and sensibly indicating the excitation of said photocells, said electrical means comprising an amplifier receiving as input the output signals of both photocells and a photocell effect control rheostat calibrated in thickness units between said second photocell and said amplifier capable of diminishing the effect of said second photocell output upon said amplifier over the same range that said effect would be diminished by causing the X-ray shadow of a complementary sample of a thickness equal to the difference between the thickness of said comparison sample and the specification thickness of the material to be gaged to fall upon said second photocell.

FREDERIC FUA.

REFERENCES CITED

The following references are of record in the file of this patent:

UNITED STATES PATENTS

| Number | Name | Date |
|---|---|---|
| 2,094,318 | Failla | Sept. 28, 1937 |
| 2,097,760 | Failla | Nov. 2, 1937 |
| 2,136,116 | Mowry | Nov. 8, 1938 |
| 2,332,422 | Zunick | Oct. 19, 1943 |
| 2,467,812 | Clapp | Apr. 19, 1949 |
| 2,469,206 | Rich | May 3, 1949 |

FOREIGN PATENTS

| Number | Country | Date |
|---|---|---|
| 546,095 | Great Britain | June 26, 1942 |

OTHER REFERENCES

Smith, General Electric Review, March 1945, pp. 13-17.